(12) United States Patent
Richey (10) Patent No.: US 9,334,891 B2
(45) Date of Patent: May 10, 2016

(54) BRACKET ASSEMBLY

(71) Applicant: H.M. Richards, Inc., Baldwyn, MS (US)

(72) Inventor: James N. Richey, Guntown, MS (US)

(73) Assignee: H.M. Richards, Inc., Baldwyn, MS (US)

( * ) Notice: Subject to any disclaimer, the term of this patent is extended or adjusted under 35 U.S.C. 154(b) by 0 days.

(21) Appl. No.: 14/518,512

(22) Filed: Oct. 20, 2014

(65) Prior Publication Data

US 2015/0037091 A1 Feb. 5, 2015

Related U.S. Application Data

(63) Continuation of application No. 13/420,320, filed on Mar. 14, 2012, now Pat. No. 8,876,073.

(51) Int. Cl.

| F16B 12/44 | (2006.01) |
|---|---|
| F16B 12/00 | (2006.01) |
| F16B 17/00 | (2006.01) |
| F16B 12/46 | (2006.01) |
| F16B 7/22 | (2006.01) |

(52) U.S. Cl.
CPC . *F16B 12/44* (2013.01); *F16B 7/22* (2013.01); *F16B 12/00* (2013.01); *F16B 12/46* (2013.01); *F16B 17/00* (2013.01); *Y10T 29/49826* (2015.01); *Y10T 29/49947* (2015.01); *Y10T 403/7043* (2015.01)

(58) Field of Classification Search
CPC .......... F16B 12/00; F16B 12/46; F16B 17/00; F16B 7/22

USPC .......... 248/220.1, 200, 225.11, 188; 108/155, 108/91; 403/231, 363; 52/167.1
See application file for complete search history.

(56) References Cited

U.S. PATENT DOCUMENTS

| 1,575,270 | A | * | 3/1926 | Jankowsky | ................ | 211/87.01 |
| 3,113,358 | A | * | 12/1963 | Zell et al. | ....................... | 312/263 |
| 3,572,787 | A | * | 3/1971 | Timmerman et al. | ......... | 403/205 |
| 3,590,753 | A | * | 7/1971 | Blink et al. | ................... | 248/188 |
| 4,124,186 | A | * | 11/1978 | Call, Sr. | ......................... | 248/188 |
| 4,846,079 | A | * | 7/1989 | Ajax | ............................. | 108/156 |
| 5,425,520 | A | * | 6/1995 | Masumoto | ..................... | 248/247 |

(Continued)

*Primary Examiner* — Anita M King
(74) *Attorney, Agent, or Firm* — John Smith T; Jeremy A. Smith; Bradley Arant Boult Cummings LLP (57) ABSTRACT

In one embodiment, the present disclosure provides a bracket assembly comprising a bridge which in turn comprises a central span, a wing attached to the central span, an arm receiving slot; and one or more alms comprising a central region and a flange, wherein said central region and said flange are connected by an offset; the bridge and said arm being adapted to be coupled together. In another embodiment, the present disclosure provides a joint comprising a first work piece and a second work piece; a bracket assembly comprising a bridge comprising a central span, having a wing extending from said central span at approximately equal angles, said bridge further comprising a arm receiving slot; and a arm comprising a central region connected by an offset to a flange, said arm further comprising a bridge receiving slot wherein said arm receiving slot and said bridge receiving slot engage thereby mating said bridge and said arm; and fastening means to connect the bracket assembly to said work pieces. The present disclosure also provides a method of using the bracket assembly to assembly furniture.

5 Claims, 8 Drawing Sheets

(56) References Cited

U.S. PATENT DOCUMENTS

| | | | |
|---|---|---|---|
| 6,050,035 A * | 4/2000 | Thompson et al. | 52/167.1 |
| 8,215,246 B2 * | 7/2012 | Quam et al. | 108/156 |
| 8,403,279 B2 * | 3/2013 | Cao et al. | 248/225.11 |
| 8,876,073 B2 * | 11/2014 | Richey | 248/220.1 |
| 2011/0108234 A1 * | 5/2011 | Cao et al. | 165/67 |

\* cited by examiner

BRACKET ASSEMBLY

CROSS REFERENCE TO RELATED APPLICATIONS

This application is a continuation of and claims priority to and the benefit of co pending U.S. patent application Ser. No. 13/420,320, filed on Mar. 14, 2012 titled "Bracket Assembly."

FIELD OF THE DISCLOSURE

The present disclosure relates to a reversibly coupling bracket assembly that can be attached to and thereby position two (2) or more angularly disposed work pieces W1, W2. In one embodiment, the bracket assembly is removably attached to work pieces W1, W2 that form part of the frame of an article of furniture.

BACKGROUND

Furniture often is manufactured in a multi-step process whereby a frame is constructed, often of wood, plywood, or oriented strand board, covered with padding and then the frame/padding structure is covered with the desired upholstery material such as cloth or leather. Currently, a substantial portion of mass-produced furniture features a pre-assembled exposed wood base that is applied to the bottom of the upholstered piece of furniture. Conventional pre-assembled frames present various challenges to construct quickly in a mass production or assembly line setting. Challenges include the proper positioning and fastening together of the various furniture support pieces. Accordingly, it is desirable to have an apparatus, such as the bracket assembly of the present disclosure, which allows for the quick, efficient, economical and proper construction of pre-assembled frames.

BRIEF DESCRIPTION OF THE FIGURES

For better understanding of the bracket assembly disclosed herein, reference should be made to the following detailed description which should be read in conjunction with the accompanying drawings, in which.

DETAILED DESCRIPTION

The corresponding structures, materials, acts, and equivalents of all means or step plus function elements in the claims below are intended to include any structure, material, or act fur performing the function in combination with other claimed elements as specifically claimed The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments herein were chosen and described in order to best explain the principles of the disclosure and the practical application, and to enable others of ordinary skill in the art to understand the disclosure for various embodiments with various modifications as are suited to the particular use contemplated. As used herein, the singular forms "a", "an" and "the" are intended to include the plural forms as well, unless the context clearly indicates otherwise, Further, as used herein, the term "approximately" means reasonably close to the quantity or quality being described as would be understood by one skilled in the art.

The bracket assembly 1 of the present disclosure provides a novel and useful way of detachably positioning at least two (2) or more work pieces W1, W2 relative to one another. As will be described below, the bracket assembly 1, in one particular embodiment, provides a novel and useful way of detachably positioning at least two (2) or more work pieces W1, W2, wherein the work pieces W1, W2 form a portion of the frame of a piece of furniture such as a sofa, recliner, table, love seat, desk or chair.

In one embodiment, the bracket assembly 1 features a bridge 2 and one or more reversibly connectable arms 14. The bridge 2 and arms 14 connect in a manner now to be explained. Bridge 2 has arm receiving slots 8a and 8b, said slots fashioned to receive bridge receiving slots 26a, 26b of said arm 14, thereby permitting free coupling of arms 14 and bridge 2, thus forming bracket assembly 1. As will be readily apparent, bridge 2 and arms 14 may be freely de-coupled from one another. in one embodiment, the interlocking of the bridge 2 and the arms 14 may be accomplished without the use of any specialized tools or fasteners. The coupling and de-coupling of the bridge 2 and arms 14 is described in greater detail below.

Bridge 2

As illustrated in FIGS. 1-5, in one embodiment, the bridge 2 includes a central span 12 and a wing 10a, 101). Further, the central span 12 and wing 10a, 10b may be disposed such that the intersection of central span 12. with the wing 10a, 10b form angles β1, β2 shown in FIG. 5. In one embodiment, the central span 12 and the wing 10a, 10b comprising the bridge 2 are formed of the same piece of material featuring two (2) bends at the intersection of the central span 12 and the wing 10a, 10b.

As further illustrated in FIGS. 1-5, in one embodiment, the bridge 2 has a plurality of apertures located on the central span 12 and the wing 10a, 10b. In one particular embodiment, the central span 12 features at least one central aperture 6, and the wing 10a, 10b feature at least one wing aperture 4a, 4b respectively.

In one embodiment, bridge 2 also includes one or more arm receiving slots 8a, 8b. As will be described below, the arm receiving slots 8a, 8b allow the bridge 2 to reversibly connect to the arms 14. In one embodiment, the arm receiving slots 8a, 8b are located approximately at the intersection of the central span 12 and wing 10a, 10b. Further, in this embodiment, the arm receiving slots 8a, 8b are notches cut in the bridge 2 extending from the edge of the bridge 2, but stopping short of the opposite edge of the bridge, as shown in FIGS. 1-5.

Figure 1:
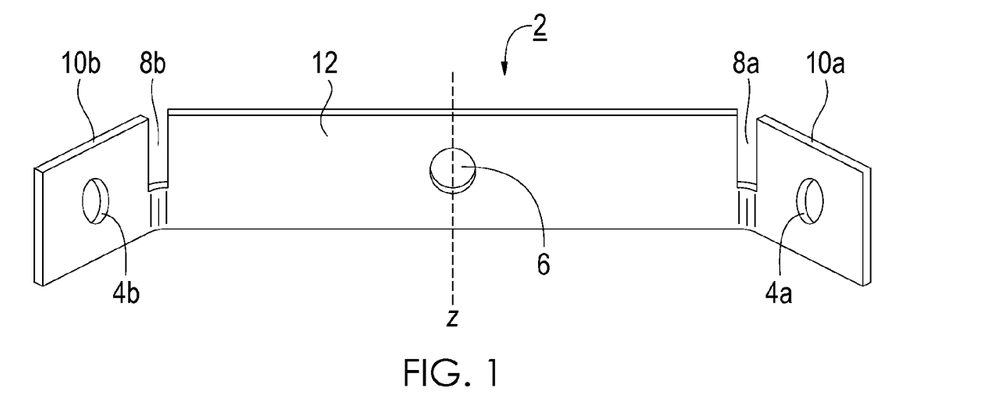
FIG. 1 shows a front view of one embodiment of the bridge 2.
Figure 2:
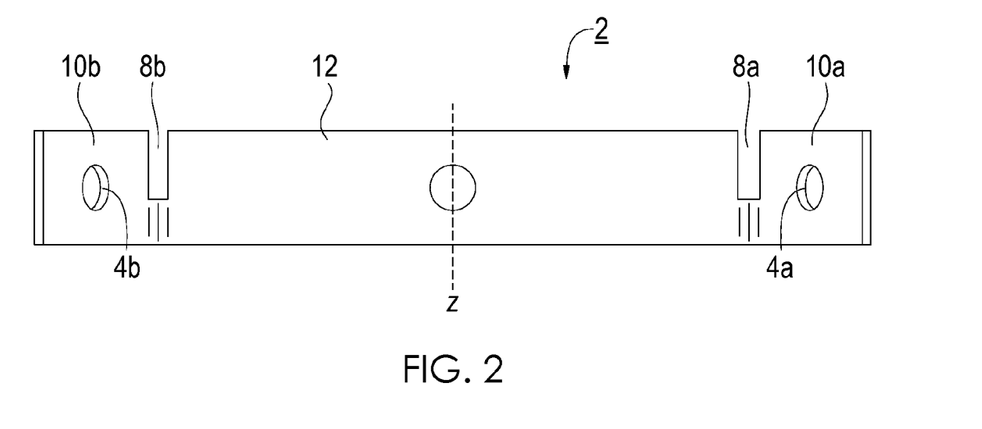
FIG. 2 shows an alternate view of the embodiment of the bridge 2 of FIG. 1.
Figure 3:
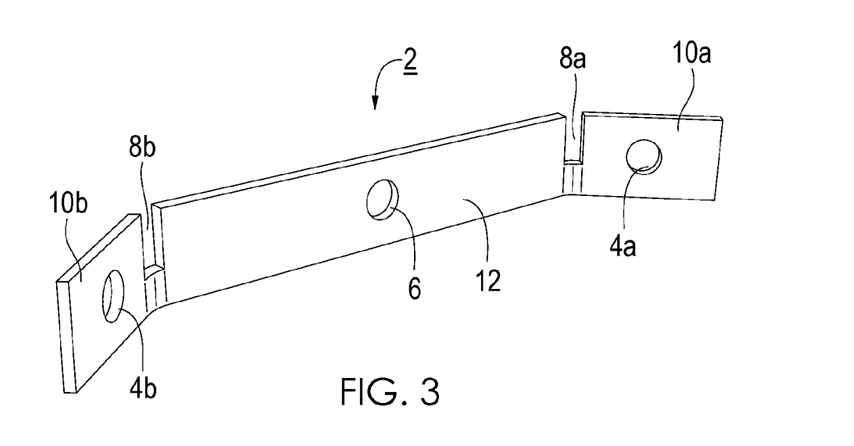
FIG. 3 shows a left-perspective view of the bridge 2 of FIG. 1.
Figure 4:
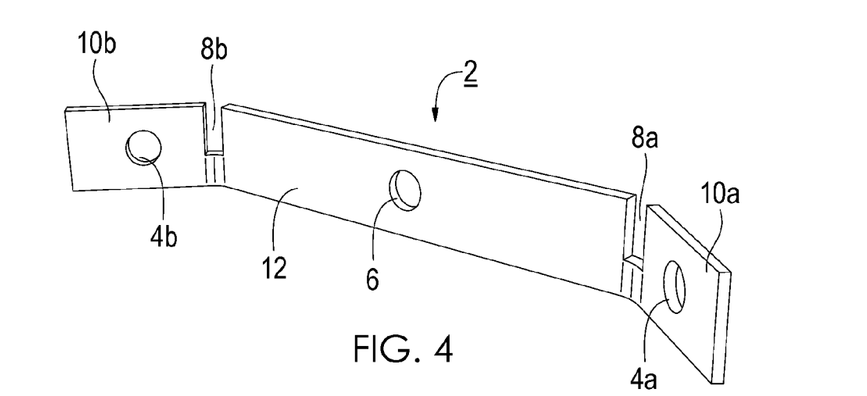
FIG. 4 shows a right-perspective view of the bridge 2 of FIG. 1.
Figure 5:
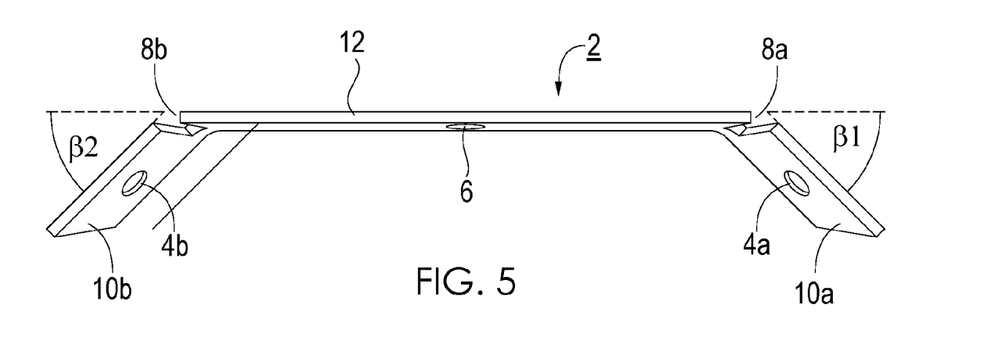
FIG. 5 shows a top view of the bridge 2 of FIG. 1.
Figure 6:
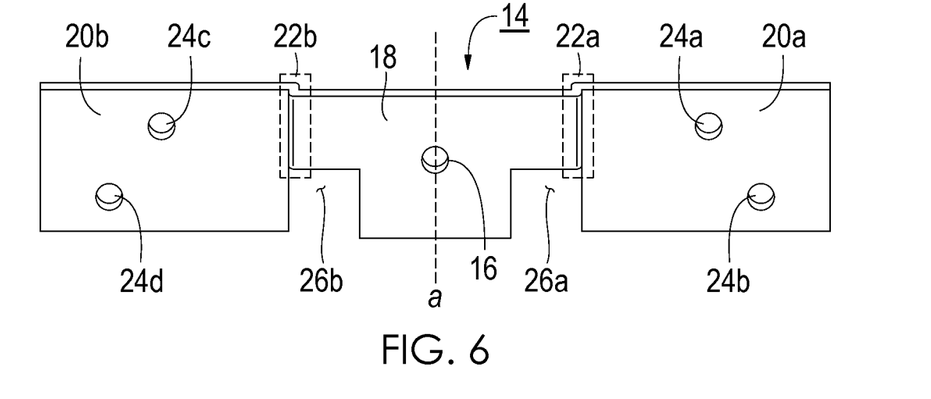
FIG. 6 shows a front view of one embodiment of an arm 14.
Figure 7:
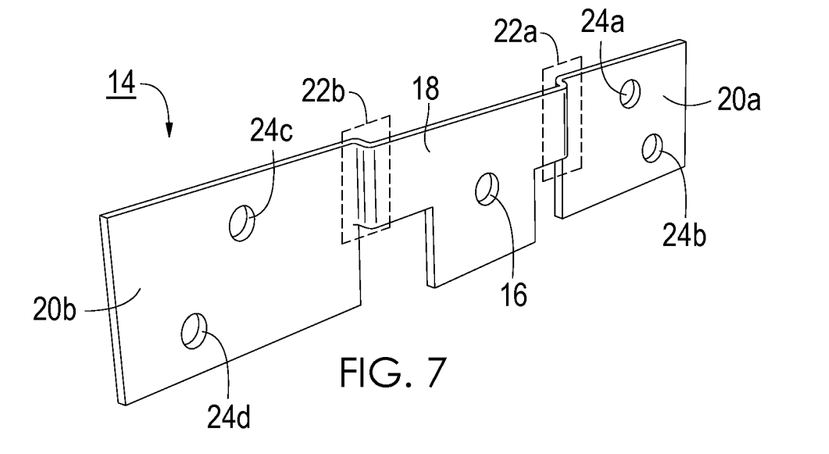
FIG. 7 shows a left-perspective view of the arm 14 of FIG. 6.
Figure 8:
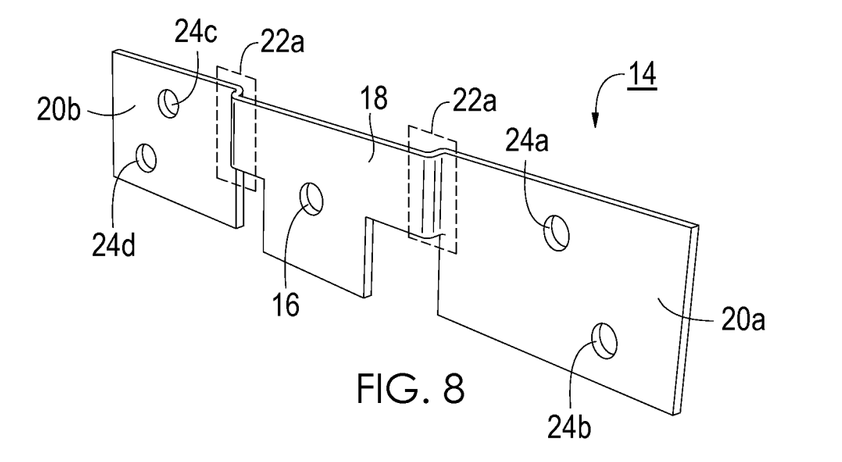
FIG. 8 shows a right-perspective view of the arm 14 of FIG. 6.

In one preferred embodiment, the bridge 2 comprises a central span 12 and two (2) wings 10a, 10b are connected opposite one another to the bridge 2 distal the central aperture 6. In this embodiment, the wings 10a, 10b and the central span 12 angularly connect proximate to the arm receiving slots 8a, 8b forming angles β1, β2 of approximately 25-55 degrees. In one embodiment, angles β1, β2 are approximately 45 degrees. As shown in FIGS. 1 and 2, in this preferred embodiment, the bridge 2 may be divided by line z through the central aperture 6 and the portions of the bridge 2 on either side of line z are approximately mirror images of one another.

Arms 14

As illustrated in FIGS. 6-10, in one embodiment the bracket assembly 1 includes an arm 14 that reversibly connects with the bridge 2. In one embodiment, the arm 14 includes a central region 18 and a flange 20a, 20b connected opposite one another to the central region 18. In one preferred embodiment, the bracket assembly 1 includes two (2) arms 14 each of which includes one (1) central region 18 and two (2) flanges 20a, 20b.

Figure 10:
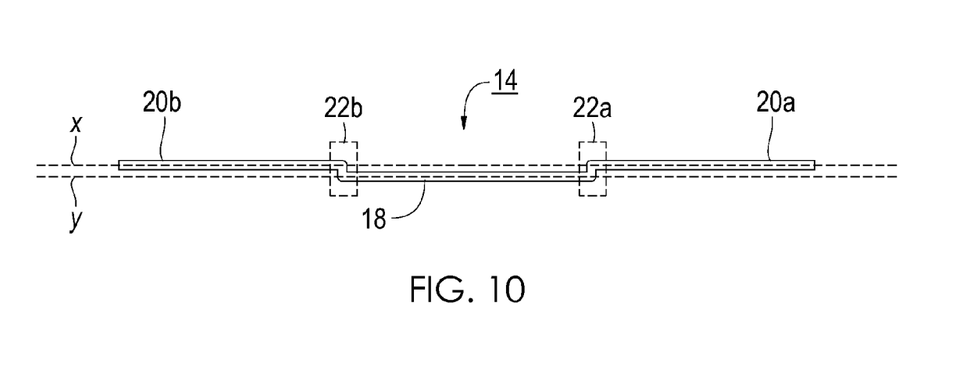
FIG. 10 shows a top view of the arm 14 of FIG. 6.
Figure 11:
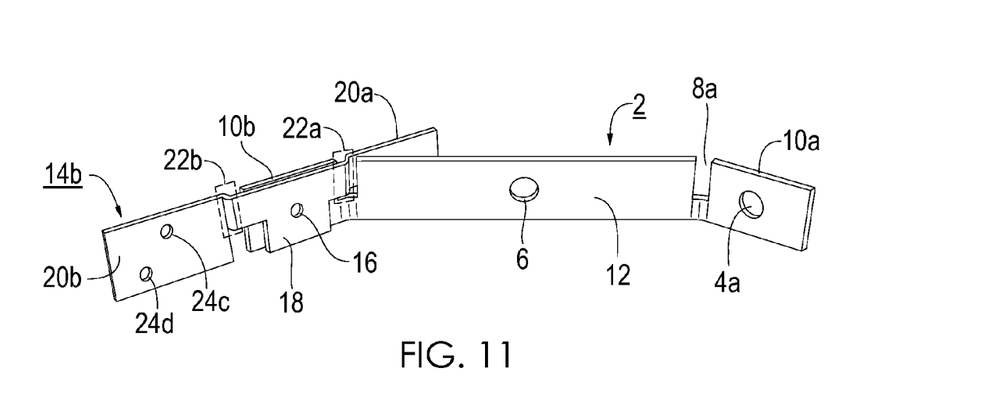
FIG. 11 shows a front view of one embodiment of a partially assembled bracket assembly 1.

In one embodiment, the flange 20a, 20b lie in a plane that is parallel to, but distinct from, the plane in which central region 18 of the arm 14 lies, as represented by lines x and y in FIG. 10. This is achieved through respective offsets 22a, 22b defined by the intersections of said flanges with central region 18, as more fully described below.

In one embodiment, the central region 18 connects to the flanges 20a, 20b through offsets 22a, 22b wherein the distance between the planes represented by lines x and y is spanned by the offsets 22a, 22b. In one embodiment, offsets 22a, 22b comprise one continuous segment. It will be appreciated by those skilled in the art that the length of said linking segments will generally correlate with the thickness of said bridge to achieve a snug fit upon coupling of said bridge and said arms. Further, in the embodiment best shown in FIG. 10, the intersections of the offsets 22a, 22b with respective flanges 20a, 20b and the intersections of said offsets 22a, 22b with central region 18 comprise "curved" portions to facilitate coupling with said bridge. However, as will be recognized by those skilled in the art, in other embodiments, offsets 22a, 22b may comprise angular bends.

In one embodiment, arms 14 include at least one bridge receiving slot, depicted as 26a, 26b in FIGS. 6-9. The bridge receiving slots 26a, 26b, in one embodiment, may be located on the central region of the arm 14, adjacent to the offsets 22a, 22b. In one embodiment, the bridge receiving slots 26a, 26d are notched in the arm 14 extending from the edge of the arm 14 but stopping short of the opposite edge of the arm 14. As described below, the bridge receiving slots 26a, 26b allow the arm 14 to be reversibly connected with the bridge 2.

Figure 9:
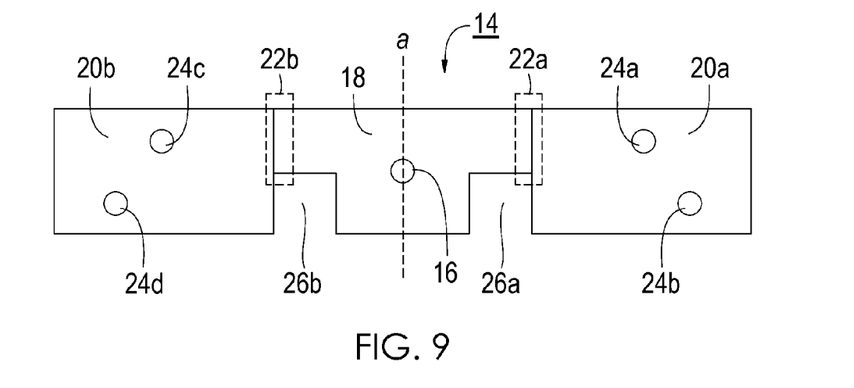
FIG. 9 shows an alternate view of the arm 14 of FIG. 6.

In one embodiment, the arm 14 features an aperture 16 located on the central region 18 of the arm 14. In one particular embodiment, the aperture 16 is centrally located on the central region 18. In one embodiment, an arm 14 may be divided about line a through the aperture 16 in the central region 18, as shown in FIG. 9. In this embodiment, the portions of the arm 14 on either side of line a are approximately mirror images of one another.

In a further embodiment, the flange 20a, 20b comprises a plurality of apertures, Shown as 24a, 24b, 24c, 24d. In one particular embodiment, each flange 20a, 20b comprises two (2) apertures, though, as will be recognized by those skilled in the art, a flange 20a, 20b could include more or less apertures depending upon the intended use of the bracket assembly 1, The apertures of the flange and bridge will facilitate secure connection to each other through fastening means. The apertures of the flange and the bridge also facilitate secure connection of the bracket assembly with work pieces through fastening means.

Construction of the Bracket Assembly 1

The bracket assembly 1 may be assembled as described herein, although the method of assembly described herein is only exemplary and is not to be construed as limiting and other methods of assembly recognized by those skilled in the art should be considered within the scope of the present disclosure.

In one preferred embodiment shown in FIGS. 11-18, the bracket assembly 1 comprises one (1) bridge 2 and two (2) arms 14a, 14b. To construct the bracket assembly 1 a user connects the bridge 2 to a first arm 14b by engaging the bridge receiving slot 26h of said arm with the arm receiving slot 8b of said bridge. In one embodiment, this engagement may occur by positioning the arm 14b over the bridge 2 and aligning the bridge receiving slot 26b of the arm 14b above the arm receiving slot 8b of the bridge 2 and lowering the arm 14b relative the bridge 2 until the arm 14b and the bridge 2 are connected. A second arm 14a, may be connected to the opposite end of bridge 2 in a similar fashion. It is envisioned that the coupling process of an arm and bridge may be achieved by hand, without the need of significant force or excessive pressure.

Figure 12:
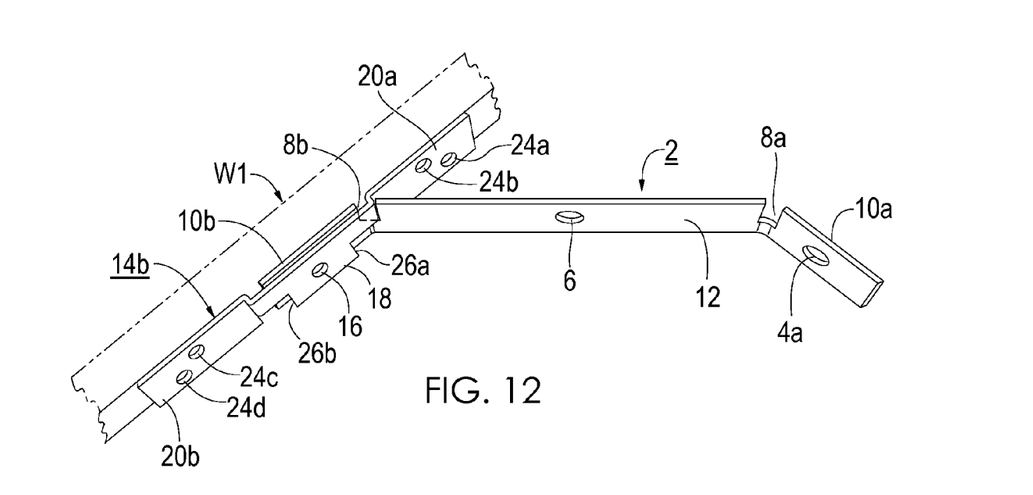
FIG. 12 shows a top view of the partially assembled bracket assembly 1 of FIG. 11.
Figure 13:
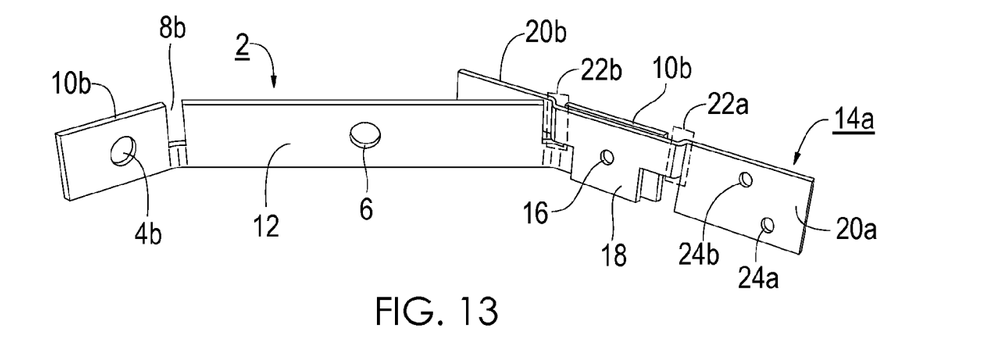
FIG. 13 shows one embodiment of a partially assembled bracket assembly 1.
Figure 14:
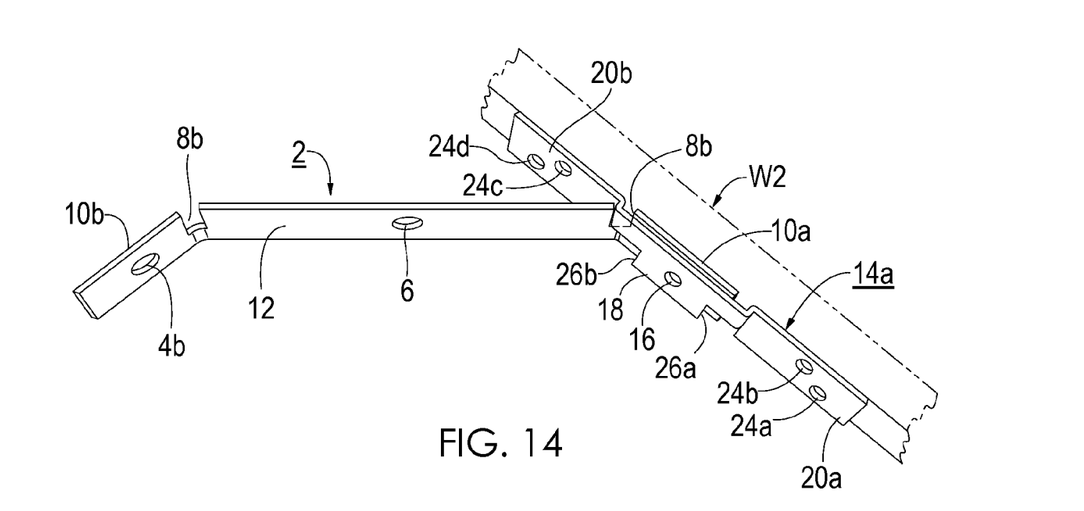
FIG. 14 shows a top view of the partially assembled bracket assembly 1 of FIG. 11.
Figure 15:
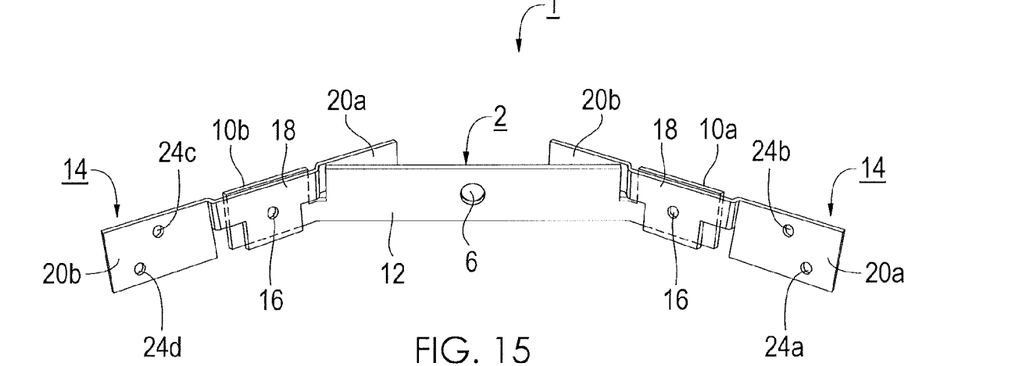
FIG. 15 shows a front view of one embodiment of a fully assembled bracket assembly 1.

In one embodiment, after the bracket assembly 1 is constructed, wing 10b of the bridge 2 is positioned behind the central region 18 of the arm 14b and the wing 10a of the bridge 2 is positioned behind the central region 18a of the aim 14a as shown in FIGS. 12 and 14. Further, after construction of the bracket assembly 1, wings 10a, 10b may lie in substantially the same plane as respective flanges 20a, 20b of the arms 14a, 14b, as further shown in FIGS. 12 and 14. The alignment of the wings 10a, 10b with the flanges 20a, 20b creates an even (or "smooth") surface against which a work piece W1, W2 may be placed and affixed.

In one embodiment, after construction of the bracket assembly 1, the aperture 4a, 4b of wing 10a, 10b align with the aperture 16 of the arm 14. This alignment serves several purposes. First, it allows the bracket assembly 1 to be attached to the work pieces W1, W2. Second, it allows the bridge 2 and the arm 14 to be held in position relative to one another.

Use/Advantages

Figure 16:
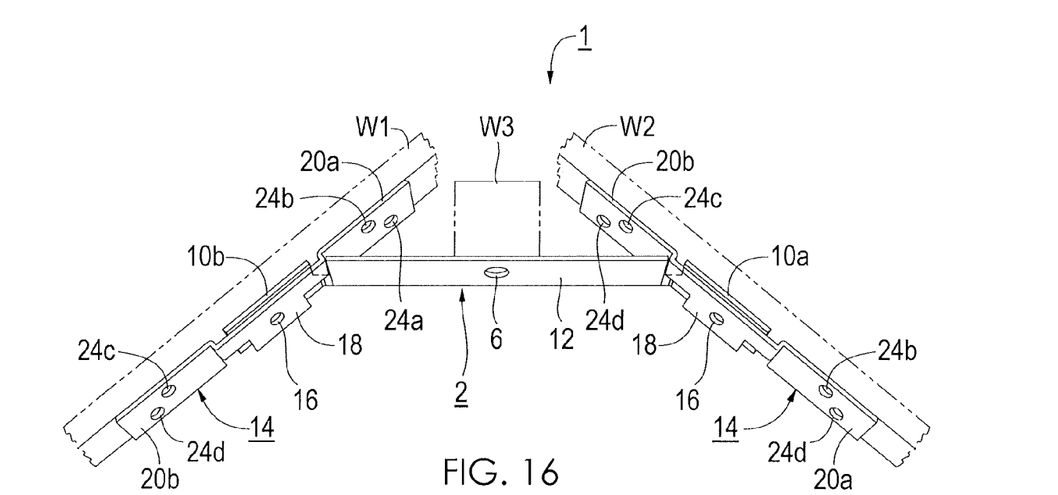
FIG. 16 shows a top view of the fully assembled bracket assembly 1 of FIG. 15.
Figure 17:
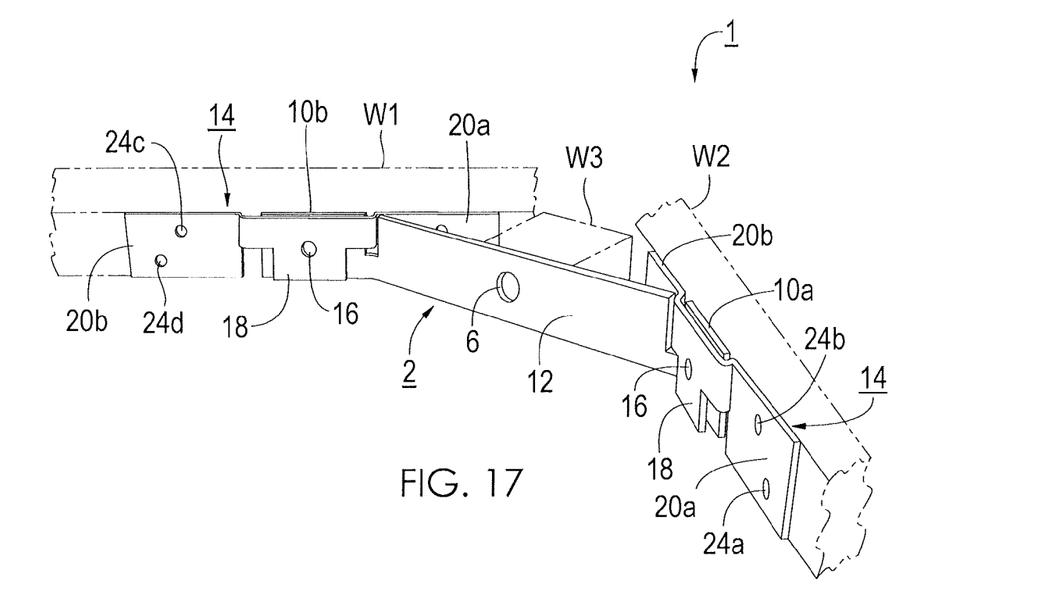
FIG. 17 shows a left-perspective view of the fully assembled bracket assembly 1 of FIG. 15.
Figure 18:
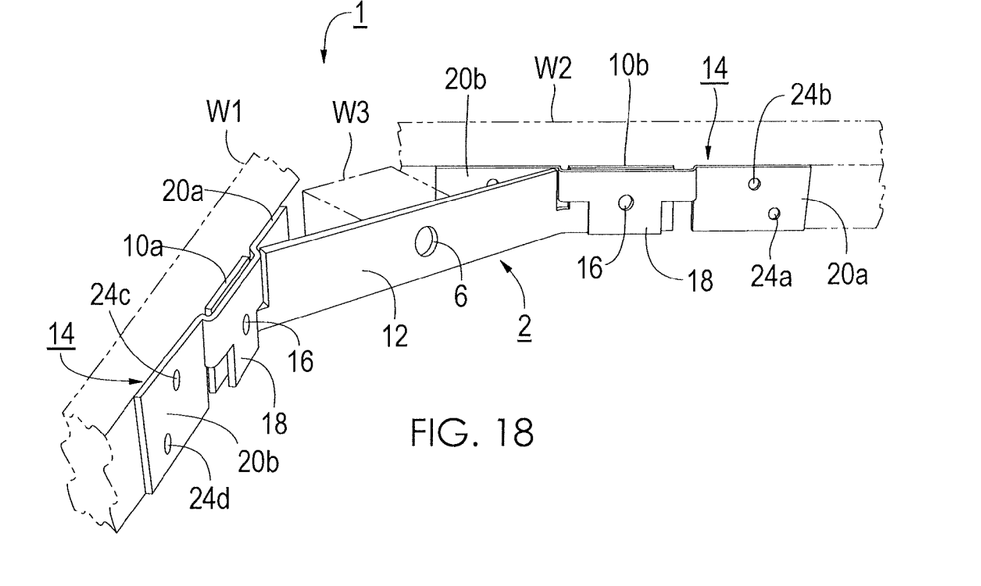
FIG. 18 shows a right-perspective view of the filly assembled bracket assembly 1 of FIG. 15.

The bracket assembly 1 of the present disclosure has many uses; however it is believed to be especially useful for the furniture industry. In one preferred embodiment, the bracket assembly 1, after construction, may be positioned so that work pieces engage the assembly 1. As shown in FIGS. 12, 14 and 16 the work pieces W1, W2, W3 comprise part of the frame of an article of furniture such as a sofa, love seat, table, desk or chair as it is desirable to create a "square" corner in the frames of the furniture to both provide the necessary structural strength to the furniture and the aesthetic qualities desired by purchasers. Where creating a "square" intersection of a frame or other work pieces is desirable, other articles of manufacture may also benefit from the use of the bracket assembly 1.

As shown in FIGS. 12, 14, after the work pieces W1, W2, W3 are positioned against the flanges 20a, 20b and the wings 10a, 10b of the bracket assembly 1, fastening means may be used to attach the bracket assembly 1 to the work pieces W1, W2 through the apertures in the bracket assembly 1. The fastening means may be any suitable fastener recognized by one skilled in the art such as screws or nails. In one embodiment, the bracket assembly 1 may be attached to the work pieces W1, W2 through the apertures 24a, 24b, 24c and 24d located respectively on the flanges 20a, 20b of the arms 14a, 14b. In other embodiments it is desirable to attach the bracket assembly 1 to the work pieces W1, W2 through the aligned apertures 4a, 4b located respectively on the wings 10a, 10b of the bridge 2 and the apertures 16 located respectively on the central regions 18 of the arms 14a, 14b. It will be appreciated that various combinations of attachments and level of securement between the assembly and the work pieces can be achieved through variations in the number, locations and use of apertures on the bridge and arms. In one further embodiment, a third work piece W3 may be attached to the bracket assembly 1 through the central aperture 6 of the bridge 2.

As would be recognized by one skilled in the art, it may be desirable to have any or all of work pieces W1, W2, W3 removably attached to the bracket assembly 1 and such removable attachment, may be accomplished through the use of screws or similar fasteners. In other embodiments, it may be desirable to permanently attach the bracket assembly 1 to any or all of the work pieces through the use of nails or other such fasteners.

In one embodiment, after the construction of the bracket assembly 1 and the attachment of the work pieces W1, W2, W3 to the bracket assembly 1, the work pieces W1, W2, W3 comprise an approximately ninety (90) degree or "square" corner.

The bracket assembly 1 of the present disclosure offers many advantages over the prior art including less expensive and more efficient manufacturing of the bracket assembly 1. It will be appreciated that the components of the bracket assembly may be standardized and used on a variety of work pieces, without the need for custom fitting. The components may be fashioned using various materials, although to achieve optimum results, it is envisioned that sturdy and durable materials such as steel or aluminum will be used. For certain applications, such as light or less expensive work pieces, it is conceivable to utilize plastic or other lightweight and less expensive materials to construct the bracket assembly 1.

What is claimed:
1. A joint comprising:
   a. a first work piece and a second work piece;
   b. a bracket assembly comprising
      i. a bridge comprising a central span, a wing, comprising an aperture, extending from the central span, the bridge further comprising an arm receiving slot; and
      ii. one or more arms comprising a central region, comprising one or more apertures, connected by an offset to a flange, the arm further comprising a bridge receiving slot;
         wherein the arm receiving slot and the bridge receiving slot engage thereby mating the bridge and the one or more arms and wherein the aperture of the central region of the one or more arms and the aperture of the wing align when the bridge and one or more arms are connected; and
   c. a fastening means to connect the bracket assembly to the work pieces.
2. The joint of claim 1 wherein the bridge further comprises a first portion and a second portion, the first and second portions comprising mirror images relative to a centerline dissecting an aperture of the central span.
3. The joint of claim 1 wherein the a in further comprising mirror images relative to a centerline dissecting an aperture of the central region.
4. A method of assembling furniture comprising:
   a. providing a first work piece;
   b. providing a second work piece;
   c. providing a bracket assembly adapted to reversibly connect to both the first work piece and the second work piece, said bracket assembly comprising:
      i. a bridge comprising a central span, a wing, comprising an aperture, extending from the central span, the bridge further comprising an arm receiving slot; and
      ii. one or more arms comprising a central region, comprising one or more apertures, connected by an offset to a flange, the arm further comprising a bridge receiving slot;
         wherein the arm receiving slot and the bridge receiving slot engage thereby mating the bridge and the one or more arms and wherein the aperture of the central region of the one or more arms and the aperture of the wing align when the bridge and one or more arms are connected.
5. The method of claim 4 wherein the furniture is selected from the group comprising of a sofa, a love seat, a recliner, a table and a desk.

\* \* \* \* \*